US008695290B1

(12) United States Patent
Kim et al.

(10) Patent No.: US 8,695,290 B1
(45) Date of Patent: Apr. 15, 2014

(54) SYSTEMS AND METHODS FOR SPLICING SOLAR PANEL RACKS

(75) Inventors: William Kim, San Mateo, CA (US); Craig Carni, Willits, CA (US); Victor Zuidema, Willits, CA (US)

(73) Assignee: Ironridge, Inc., Hayward, CA (US)

( * ) Notice: Subject to any disclaimer, the term of this patent is extended or adjusted under 35 U.S.C. 154(b) by 0 days.

(21) Appl. No.: 12/959,187

(22) Filed: Dec. 2, 2010

Related U.S. Application Data

(60) Provisional application No. 61/267,409, filed on Dec. 7, 2009.

(51) Int. Cl.
*E04D 13/18* (2006.01)

(52) U.S. Cl.
USPC ............. 52/173.3; 52/586.1; 52/846; 52/848; 52/843; 403/292; 248/225.21; 248/225.11

(58) Field of Classification Search
CPC ..... Y02B 10/12; F16M 13/02; F16M 11/046; E04C 2003/043; E04C 2003/0469; E04C 3/07
USPC ............. 52/173.3, 586.1, 845, 846, 848, 843; 403/292, 297, 298; 248/237, 225.21, 248/225.11, 500, 680; 126/623; 136/244, 136/251
See application file for complete search history.

(56) References Cited

U.S. PATENT DOCUMENTS

| | | | | |
|---|---|---|---|---|
| 4,123,883 A * | 11/1978 | Barber et al. | ................... | 52/200 |
| 4,429,872 A * | 2/1984 | Capachi | ......................... | 473/490 |
| 5,092,087 A * | 3/1992 | Kane et al. | ......................... | 52/15 |
| 5,127,762 A * | 7/1992 | Havlovitz | ..................... | 403/298 |
| 5,203,135 A * | 4/1993 | Bastian | ........................... | 52/848 |
| 5,460,660 A * | 10/1995 | Albright et al. | ............... | 136/251 |
| 6,093,884 A * | 7/2000 | Toyomura et al. | ............ | 136/244 |
| 6,105,317 A * | 8/2000 | Tomiuchi et al. | ............ | 52/173.3 |
| 6,324,988 B1 * | 12/2001 | Svensson | ........................ | 104/89 |
| 6,959,517 B2 * | 11/2005 | Poddany et al. | ............. | 52/173.3 |
| 7,012,188 B2 * | 3/2006 | Erling | ........................... | 136/251 |
| 7,260,918 B2 | 8/2007 | Liebendorfer | | |
| 7,300,059 B2 * | 11/2007 | Caruso | ......................... | 273/400 |
| 7,406,800 B2 | 8/2008 | Cinnamon et al. | | |
| 7,434,362 B2 * | 10/2008 | Liebendorfer | ............... | 52/173.3 |
| 7,592,537 B1 * | 9/2009 | West | ............................. | 136/251 |
| 7,634,875 B2 * | 12/2009 | Genschorek | ................. | 52/173.3 |
| 7,748,175 B2 * | 7/2010 | Liebendorfer | ............... | 52/173.3 |
| 7,766,292 B2 * | 8/2010 | Liebendorfer | ............... | 248/237 |
| 7,774,998 B2 * | 8/2010 | Aschenbrenner | ............. | 52/173.3 |
| D627,717 S * | 11/2010 | Munoz et al. | ............... | D13/102 |
| 7,832,157 B2 * | 11/2010 | Cinnamon | ................... | 52/173.3 |
| 7,832,180 B2 * | 11/2010 | Dolby | ............................. | 52/848 |
| 7,866,098 B2 * | 1/2011 | Cinnamon | ................... | 52/173.3 |
| 7,987,641 B2 * | 8/2011 | Cinnamon | ................... | 52/173.3 |
| 8,109,048 B2 * | 2/2012 | West et al. | ................... | 52/173.3 |

(Continued)

*Primary Examiner* — Brent W Herring
(74) *Attorney, Agent, or Firm* — Wilson Sonsini Goodrich & Rosati

(57) ABSTRACT

The invention provides systems and methods for splicing solar panel racks. Solar panel racks may include one, two, or more solar rack sections that may be connected to one another with an internal splice. The internal splice may internally support the adjoining solar racks. The solar rack may be secured to a support surface using one or more feet. The solar panel racks may be configured to support the weight of one or more solar modules. One or more solar module securing component may be used to secure the solar modules to a solar rack surface.

9 Claims, 12 Drawing Sheets

(56) References Cited

U.S. PATENT DOCUMENTS

| | | | |
|---|---|---|---|
| 8,128,044 B2* | 3/2012 | Liebendorfer | 248/237 |
| 8,141,306 B2* | 3/2012 | Masuda et al. | 52/173.3 |
| 8,176,693 B2* | 5/2012 | Abbott et al. | 52/173.3 |
| 8,181,402 B2* | 5/2012 | Tsuzuki et al. | 52/173.3 |
| 8,240,109 B2* | 8/2012 | Cusson et al. | 52/745.05 |
| 8,376,298 B2* | 2/2013 | McPheeters | 248/231.41 |
| 8,387,319 B1* | 3/2013 | Gilles-Gagnon et al. | 52/173.3 |
| 8,511,009 B2* | 8/2013 | Kobayashi et al. | 52/173.3 |
| 8,585,000 B2* | 11/2013 | McPheeters | 248/228.2 |
| 8,595,996 B2* | 12/2013 | Korman et al. | 52/173.3 |
| 8,595,997 B2* | 12/2013 | Wu | 52/173.3 |
| 2003/0015637 A1* | 1/2003 | Liebendorfer | 248/237 |
| 2004/0163338 A1* | 8/2004 | Liebendorfer | 52/173.1 |
| 2005/0115176 A1* | 6/2005 | Russell | 52/220.1 |
| 2007/0102036 A1 | 5/2007 | Cinnamon | |
| 2007/0295392 A1 | 12/2007 | Cinnamon | |
| 2007/0295393 A1 | 12/2007 | Cinnamon | |
| 2008/0000173 A1* | 1/2008 | Lenox et al. | 52/173.1 |
| 2008/0172955 A1 | 7/2008 | McClintock et al. | |
| 2009/0242014 A1* | 10/2009 | Leary | 136/251 |
| 2010/0236183 A1* | 9/2010 | Cusson et al. | 52/645 |
| 2010/0263297 A1* | 10/2010 | Liebendorfer | 52/11 |
| 2010/0276558 A1* | 11/2010 | Faust et al. | 248/222.14 |
| 2010/0293874 A1* | 11/2010 | Liebendorfer | 52/173.3 |
| 2011/0214368 A1* | 9/2011 | Haddock et al. | 52/173.3 |
| 2011/0302859 A1* | 12/2011 | Crasnianski | 52/173.3 |

\* cited by examiner

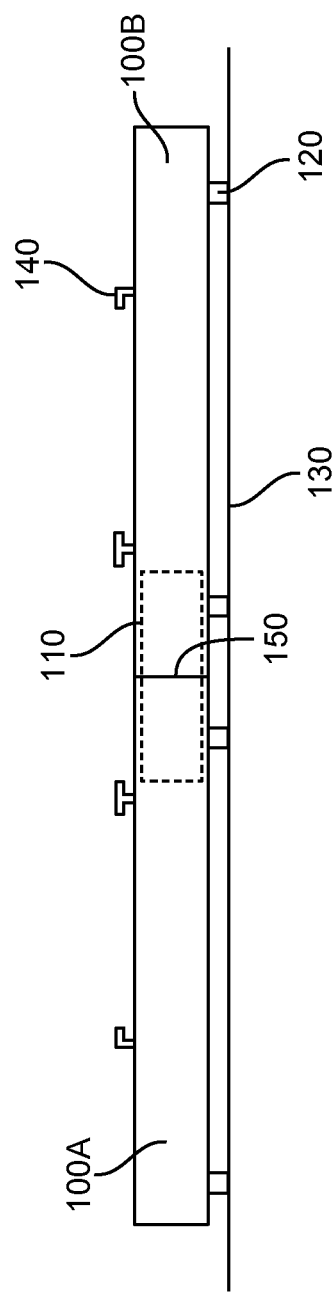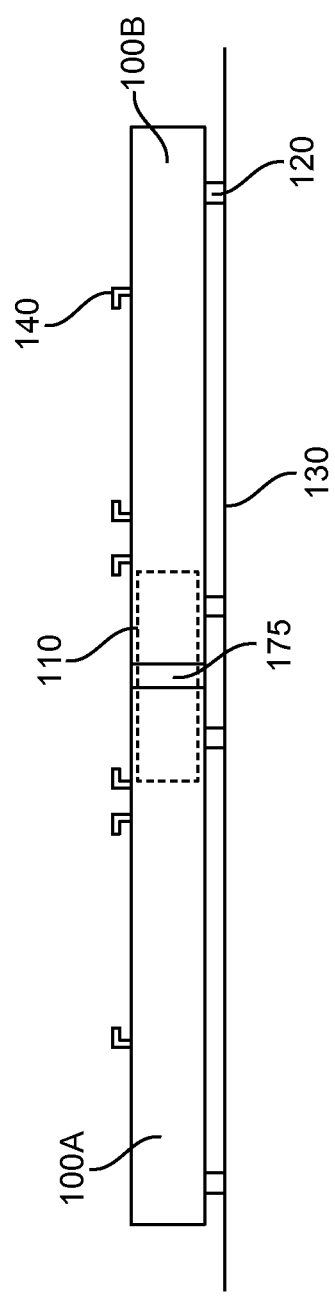

SYSTEMS AND METHODS FOR SPLICING SOLAR PANEL RACKS

CROSS-REFERENCE

This application claims the benefit of U.S. Provisional Application No. 61/267,409, filed Dec. 7, 2009, which application is incorporated herein by reference in its entirety.

BACKGROUND OF THE INVENTION

Solar electric systems are an environmentally friendly way of generating electricity. Such solar electric systems typically include a solar module having a photovoltaic panel and a solar module frame. The solar modules may be assembled and/or installed on a surface, such as the roof of a building, the ground, or other support structure, such as a pole or pole mounted frame.

A solar module mounting system may include one or more components that may be desired at long dimensions. Components with long dimensions may be cumbersome to transport and/or install. Some previous systems have attempted to simplify installation by providing solar module frames that can be assembled from multiple components or solar modules whose frames may connect directly to one another. See, e.g., U.S. Patent Publication No. 2008/0172955; U.S. Pat. No. 7,406,800; U.S. Patent Publication No. 2007/0295392; U.S. Patent Publication No. 2007/0295393; and U.S. Patent Publication No. 2007/0102036, which are hereby incorporated by reference in their entirety.

However, for ventilation and drainage purposes it is beneficial to mount a solar module above the surface with an air gap between the roof surface and underside of the modules. Also, in some embodiments, it may be beneficial to have a mounting system that can accommodate varying types and sizes of solar panels.

Thus, a need exists for improved systems and methods of mounting solar modules to a surface.

SUMMARY OF THE INVENTION

The invention provides systems and methods for splicing solar panel racks. Various aspects of the invention described herein may be applied to any of the particular applications set forth below or for any other types of solar energy generation systems. The invention may be applied as a standalone system or method, or as part of integrated solar panel installation procedure. It shall be understood that different aspects of the invention can be appreciated individually, collectively, or in combination with each other.

A solar panel rack system may be a flexible and straightforward roof mounting solution for a wide variety of solar photovoltaic (PV) needs. It may have a modular design, which can easily handle a wide variety of panel sizes and quantities. The solar panel rack system may have one or more solar rack arranged on a support surface. The solar rack may include a first solar rack section, a second solar rack section, and an internal rack splice configured to internally support the first solar rack section and the second solar rack section, thereby connecting the first solar rack section to the second solar rack section. The solar rack may also have one or more solar module securing component, wherein said solar module securing component is configured to secure a solar module to a solar rack surface.

The internal splice may be a structural element that is used to join together two solar rack sections. This may be desirable when the desired row length of a solar array is longer than the actual rack.

Most traditional splice components connect two rails by overlapping a bar or a plate on the outside of the two rails. This bar is typically secured to the rails using bolts/nuts or self-drilling/self-tapping screws (e.g., tek screws). Although the external splice provides some structural strength, they are not as strong as the rails themselves. The external splice usually requires additional support by placing footing attachments on both sides of the splice.

An internal splice may combine two solar rack sections together through an internal bar that may fit in the hollows of the two rack sections. The internal splice bar may be secured inside one of the rack sections (typically using self-drilling or self-tapping screws such as tek screws). Then the second rack section simply slides over the splice bar until it is adjoining the first rack section.

There are several advantages to using an internal splice:

1. More flexibility in footing attachment locations. With an external splice, the bar could potentially be in the location that the footing attachment would ideally be placed. With the internal splice, there is complete freedom to place the footing attachment anywhere along the rack sections.
2. Easier to align rails. Since the internal splice can be attached to one rack section first, the second rack section can be aligned to the first rack section by using the splice as a guide. With external splices, the two rack sections need to be aligned first before the splice bar can be attached. This is not an easy task as rack sections can often be 20' longer.
3. Stronger support connection. External splice bars typically require a footing attachment on both sides of the bar to provide additional support. The internal splice bar does not require these additional attachments since support is provided on all directions. The strong support provided by the internal splice may reduce the need for additional attachments. Reducing the number of attachments and the number of roof penetrations may advantageously reduce the risk of roof leakages.
4. More pleasing aesthetics. Utilizing an internal splice provides a more pleasing visual as there are no external bars/plates to interrupt the clean lines of the rack sections.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1A shows a solar rack in accordance with an embodiment of the invention.

FIG. 1B shows another example of a solar rack.

DETAILED DESCRIPTION OF THE INVENTION

Figure 2:
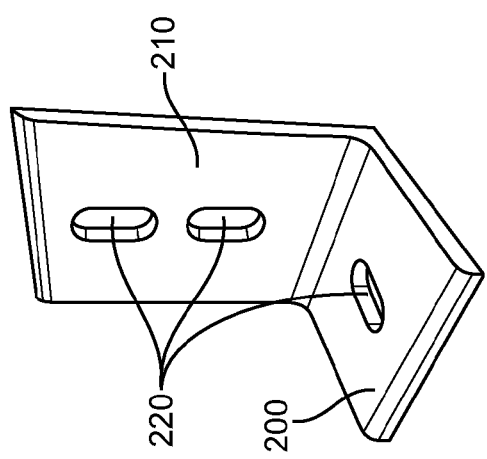
FIG. 2 shows a rack anchor in accordance with an embodiment of the invention.

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

I. Solar Rack Assembly

FIG. 1A shows a side view of a solar rack in accordance with an embodiment of the invention. A solar rack may include a first solar rack section 100A and a second solar rack section 100B. The solar rack sections may be connected by an internal rack splice 110. The solar rack may be provided on a support surface 130 and may optionally be connected to the support surface via one or more rack anchor 120. One or more solar module securing component 140 may be provided on the solar rack. A solar module may be configured to rest on the solar rack and be secured by the solar module securing component. An interface 150 may be provided between the first solar rack section and the second solar rack section.

A solar rack may include one, two, three, four, or more solar rack sections. Although a first solar rack section 100A and a second solar rack section 100B are displayed end to end, any number of solar rack sections may be utilized. In some embodiments, each of the solar rack sections may be arranged end to end so that the solar rack forms a substantially straight line. In other embodiments, the solar rack sections themselves may or may not be straight, so that the solar rack may or may not form a straight line, or may include bends or curves. In some embodiments, each solar rack section may have a first end and a second end. In other embodiments, solar rack sections may have a third, fourth, or additional ends if they include sections that may branch off. In such situations, solar rack sections need not have a linear configuration.

In some embodiments, a solar rack section may be formed by extrusion. In some embodiments, the cross-section of the rack section along the length of the rack section may remain the same (e.g., same size and shape). In other embodiments, the cross-section of the rack section may vary along the length of the rack section (e.g., the size and/or shape may vary).

Solar rack sections may be connected by an internal rack splice 110. An internal rack splice may be configured to internally support one or more solar rack sections. For example, if an internal rack splice has two ends, the internal rack splice may internally support a first solar rack section 100A and a second solar rack section 100B. The internal rack splice may have a linear configuration so that a first end may be opposing a second end. In some instances, the internal splice may be formed by extrusion. In some situations, the cross-section of the internal splice along the length of the internal splice may remain the same (e.g., same size and shape). In other embodiments, the cross-section of the internal splice may vary along the length of the internal splice (e.g., the size and/or shape may vary). In alternate embodiments, the internal splice may have additional ends to form a branching off structure, or may be formed with a bend or a curve so that the internal splice need not be straight. By supporting the solar rack sections, the internal splice may be connecting the solar rack sections. The internal splice may connect the solar rack sections so that they are or are not in contact with one another.

The interface 150 between the solar rack sections may have any configuration. For example, an internal splice 110 may connect a first solar rack section 100A and a second solar rack section 100B so that they contact one another. In some instances, the solar rack sections may contact one another so that they appear for form a continuous rack. The ends of the solar rack sections may be flush against one another. In some embodiments, the ends of the solar rack sections may be straight. In other embodiments, they may be curved or have features that may not be straight, but that may enable the ends of the solar rack sections to fit flush against one another (e.g., like puzzle pieces). In other embodiments, the solar rack ends may have a gap between one another (e.g., not contacting one another), or may have parts where gaps are provided (e.g., contacting one another, but not along the entire circumference of the solar rack).

The solar rack may be resting on a support surface 130. In some embodiments, the support surface may be the roof of a building. In some instances, the solar rack may be provided on a residential or commercial rooftop. In another example, the support surface may be the ground, or any other support structure, such as a pole or pole-mounted frame.

The solar rack may be resting directly on the support surface 130. One or more rack anchor 120 may be provided to mount the solar rack to the support surface. In some instances, the rack anchor may cause the solar rack to be fixed to the support surface so that it directly contacts the support surface. In other instances, the rack anchor may cause the solar rack to be elevated over the support surface, so that it need not contact the support surface. One, two, three, four, five, six, seven, eight, nine, ten, or more rack anchors may be provided per solar rack, or per solar rack section. The solar rack section may have configurations that may enable one or more rack anchor to be selectively placed anywhere along the length of the solar rack. For example, the solar rack section may include a groove through which a rack anchor may slide. In other embodiments, the solar rack sections may have configurations that may enable a one or more rack anchor to be placed anywhere at predetermined locations along the length of the solar rack. For example, one or more hole, locking mechanism, or other feature may be placed along selected locations along the length of the solar rack.

In some embodiments, the rack anchor may be configured so that the height of the solar rack from the support surface may be adjustable. For example, the rack anchor may include a slot, groove, holes, or other features that may enable the height of the rack anchor to be adjusted. This may be advantageous in situations where the support surface may be uneven or wavy. Thus, different rack anchors on the same solar rack may or may not be positioned at the same height. The rack anchor may have any configuration, which may or may not include a bracket, hinge, ball and socket, screw, telescoping features, or any other shape that may accommodate a surface structure. In some instances, the rack anchor may be fixed to the support structure using a penetrating feature (e.g., screw, bolt), or may have ballast which may keep the rack anchor in place.

A solar rack may include one or more solar module securing component 140. In some embodiments, the solar rack may support the weight of one or more solar module. The solar module may be secured on the solar rack by the solar module securing component. In some embodiments, the solar module securing component may be a clamp. In some instances end clamps may be provided to secure a solar module, or center clamps may be provided which may be used between a two solar modules to secure both solar modules. Any other securing mechanism known or later developed in the art may be used to secure a solar module to a solar rack including, but not limited to, slide and lock assemblies, ties, fasteners, adhesives, nails, boils, screws, teeth, magnets, snap-fits, or friction fits.

The solar module securing components 140 may be located anywhere along the length of the solar rack. Preferably, the securing components may be on the top of the solar rack. One, two, three, four, five, six, seven, eight, nine, ten, or more module securing components may be provided per solar rack, or per solar rack section. The solar rack section may have configurations that may enable one or more module securing components to be selectively placed anywhere along the length of the solar rack. For example, the solar rack section may include a groove on top or side through which a solar module securing component may slide. In other embodiments, the solar rack sections may have configurations that may enable a one or more solar module securing component to be placed anywhere at predetermined locations along the length of the solar rack. For example, one or more hole, locking mechanism, or other feature may be placed along selected locations along the length of the solar rack.

FIG. 1B shows another example of a solar rack. A solar rack may include the first solar rack section 100A and the second solar rack section 100B. The solar rack sections may be connected by the internal rack splice 110. In some embodiments, the internal rack splice may have an external component 175 located between the first and second solar rack sections. The solar rack may be provided on the support surface 130 and may optionally be connected to the support surface via one or more rack anchor 120. One or more solar module securing component 140 may be provided on the solar rack. A solar module may be configured to rest on the solar rack and be secured by the solar module securing component.

The internal rack splice 110 may have two, three, four, or more ends that may come off the external component 175. Preferably, the internal rack splice may have a first end and an opposing second end. The internal rack splice may internally support a plurality of rack sections, thereby connecting the rack sections. The rack sections may slide over the internal components of the internal splice. The external component 175 may prevent the rack sections from contacting one another. In a preferable embodiment, the circumferential dimensions of the external component may match the circumferential dimensions of the rack sections so that when they are connected, a continuous piece is formed. Alternatively, the dimensions of the external component need not match the dimensions of the rack section. The ends of the rack sections may or may not be flush against the external component of the internal splice.

II. Solar Rack Components

FIG. 2 shows a rack anchor in accordance with an embodiment of the invention. A rack anchor may be used to mount a solar rack with a support surface. For example, a rack anchor may attach to a roof, ground, or other support surface, and may be the anchor point for the rest of the panel assembly. In one example, the rack anchor may have an 'L' shape. The bottom end 200 of the 'L' may be configured to contact the support surface, while the side end 210 of the 'L' may be configured to contact the solar rack. The rack anchor may have one or more holes 220. This may enable fasteners such as screws, nails, bolts, or nuts to be used to secure the rack anchor to the support structure and/or solar rack.

Figure 3:
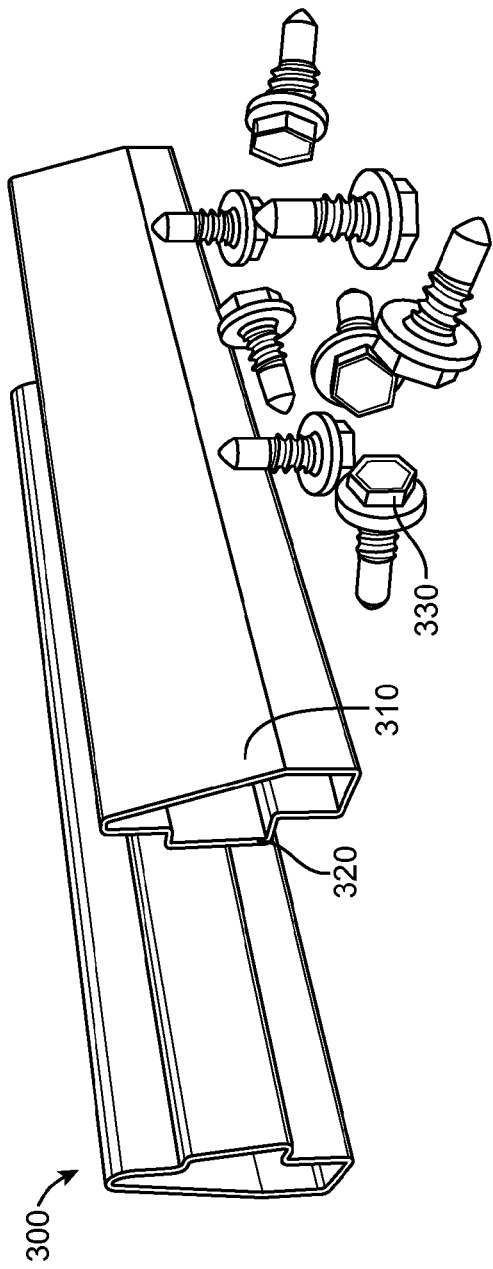
FIG. 3 shows an example of an internal splice.

FIG. 3 shows an example of an internal splice 300. As previously discussed, the internal splice may be formed by extrusion. In some instances, the internal splice may be formed of a metal, such as aluminum, steel, iron, silver, gold, copper, brass, titanium, or any mixture or alloy thereof. Alternatively, the internal splice may be formed of any composite material, plastic, or any other material of sufficient strength or desired material properties. The internal splice may have any cross-sectional shape. In some instances, the external part of the splice's cross-sectional shape may match the internal surface of a rack section. For example, the internal splice may have a slanted portion 310 and/or a protruding section 320.

The internal splice may have any dimension. In some instances, the dimensions of the internal splice may be selected to be sufficient to internally support the rack section. For example, heavier or longer rack sections may make it desirable to have longer internal splices. In some instances, the internal splices may be about 2 to 18 inches long, 3 to 12 inches long, 4 to 10 inches long, or 6-8 inches long.

An internal splice may slide within a solar rack section. For example, about half an internal splice may slide within one solar rack, while the other half of the internal splice may slide within another solar rack, thereby connecting them. Any portion of an internal splice may be within one solar rack or another. For example, one third of an internal splice may be within a solar rack while two thirds the internal splice may be within another solar rack. Similarly, one fourth, three eighths, one fifth, etc. of an internal splice bar may be within one solar rack while the remainder or a fraction of the remainder of the internal splice bar may be within another solar rack. In some embodiments, screws, or other fasteners may be used to secure an internal splice within the solar racks. In some embodiments, 10-16×½" self-drilling, self tapping stainless steel screws 330 may be used. In other embodiments, the internal splices may be friction fit within the solar racks without the need for additional fasteners.

Figure 4:
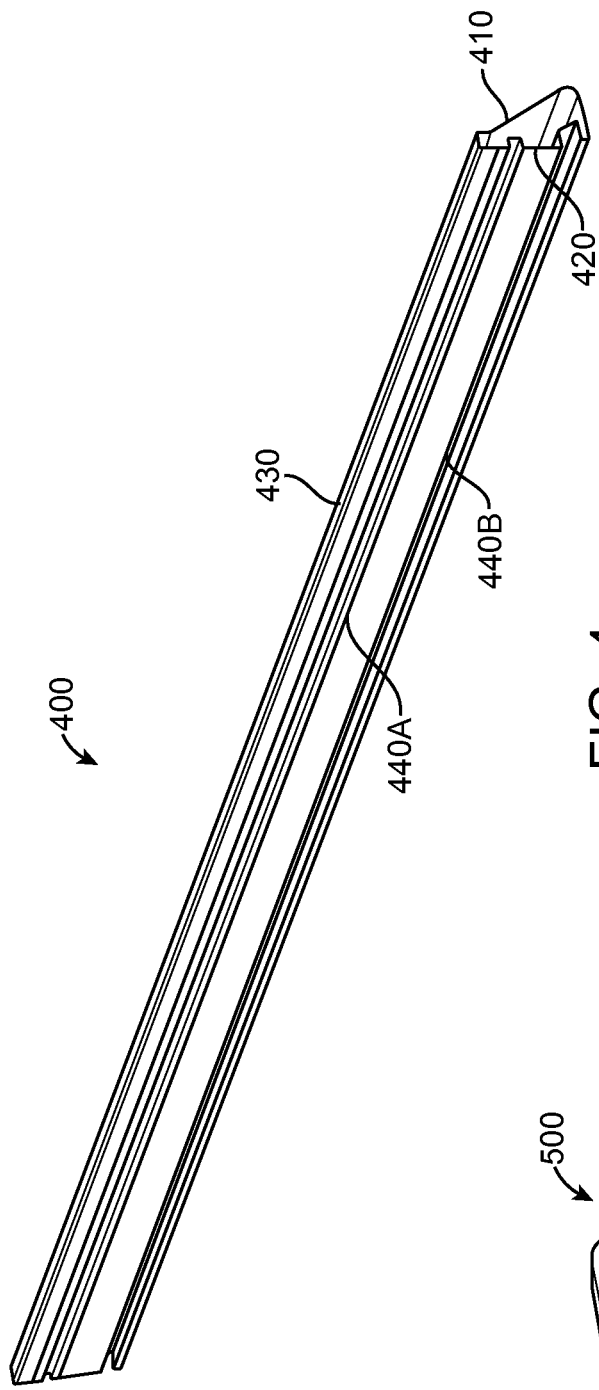
FIG. 4 shows a solar rack section.

FIG. 4 shows a solar rack section 400. In some embodiments, a solar rack section may be formed by extrusion. The solar rack section may be formed of a metal, such as aluminum, steel, iron, silver, gold, copper, brass, titanium, or any mixture or alloy thereof. Alternatively, the rack section may be formed of any composite material, plastic, or any other material of sufficient strength or desired material properties. The rack section may have any cross-sectional shape. In some instances, the internal part of the rack section's cross-sectional shape may match the external surface of internal splice bar. For example, the rack section may have a slanted portion 410 and/or a protruding section 420.

The external surface of the rack section may include surface features such as slots, grooves, or holes that may be configured to accept or connect with a rack anchor and/or solar module securing component. In one embodiment, a top groove 430, and/or side grooves 440A, 440B may extend along the length of the rack section. In some embodiments, the grooves may be T-slots.

The rack section may have may have any dimension. In some instances, the rack sections may be about 6 inches or more, 1 foot or more, 2 feet or more, 3 feet or more, 4 feet or more, 5 feet or more, 6 feet or more, 8 feet or more, 10 feet or more, 15 feet or more, or 20 feet or more long.

Figure 5:
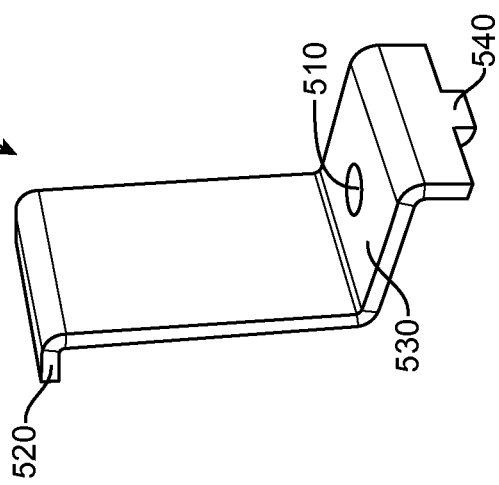
FIG. 5 shows an example of a solar module securing component.

FIG. 5 shows an example of a solar module securing component. In one embodiment, a solar module securing component may be an end clamp 500. The end clamp may be secured to the top of a solar rack section at the bottom of the end clamp. For example, the end clamp may have a hole 510, that may fit over a bolt that is placed on the top of the solar rack. The end clamp may include a top portion 520 that may reach over at least a part of the solar module. In some instances, the end clamp may hook over a part of a solar module frame. End clamps may clamp the outside ends of solar photovoltaic modules to the racks.

The bottom 530 of the end clamp may include a tab 540 that may fit into a slot, groove, or hole in the solar rack. This may keep the end clamp oriented in a desired direction.

Figure 6:
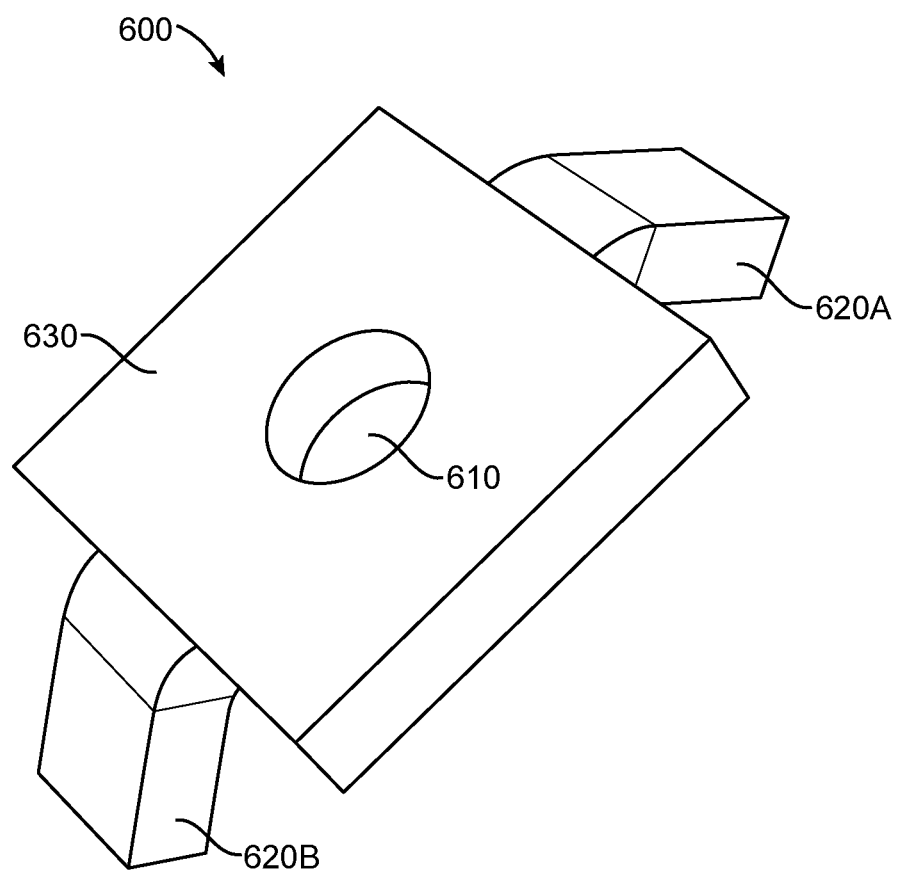
FIG. 6 shows an additional example of a solar module securing component.

FIG. 6 shows an additional example of a solar module securing component. In one embodiment, a solar module securing component may be a center clamp 600. The center clamp may clamp the inside edges of solar photovoltaic modules to racks. The center clamp may be secured to the top of a solar rack via bolt, screw, or similar fastener. The center clamp may have a hole 610 through which the bolt, screw, or similar fastener may go. The center clamp may include one, two or more tabs 620A, 620B that can extend downward, and that may fit between multiple solar modules. The flat portion 630 of the center clamp may fit over a solar module or may hook over solar module frames.

Figure 7:
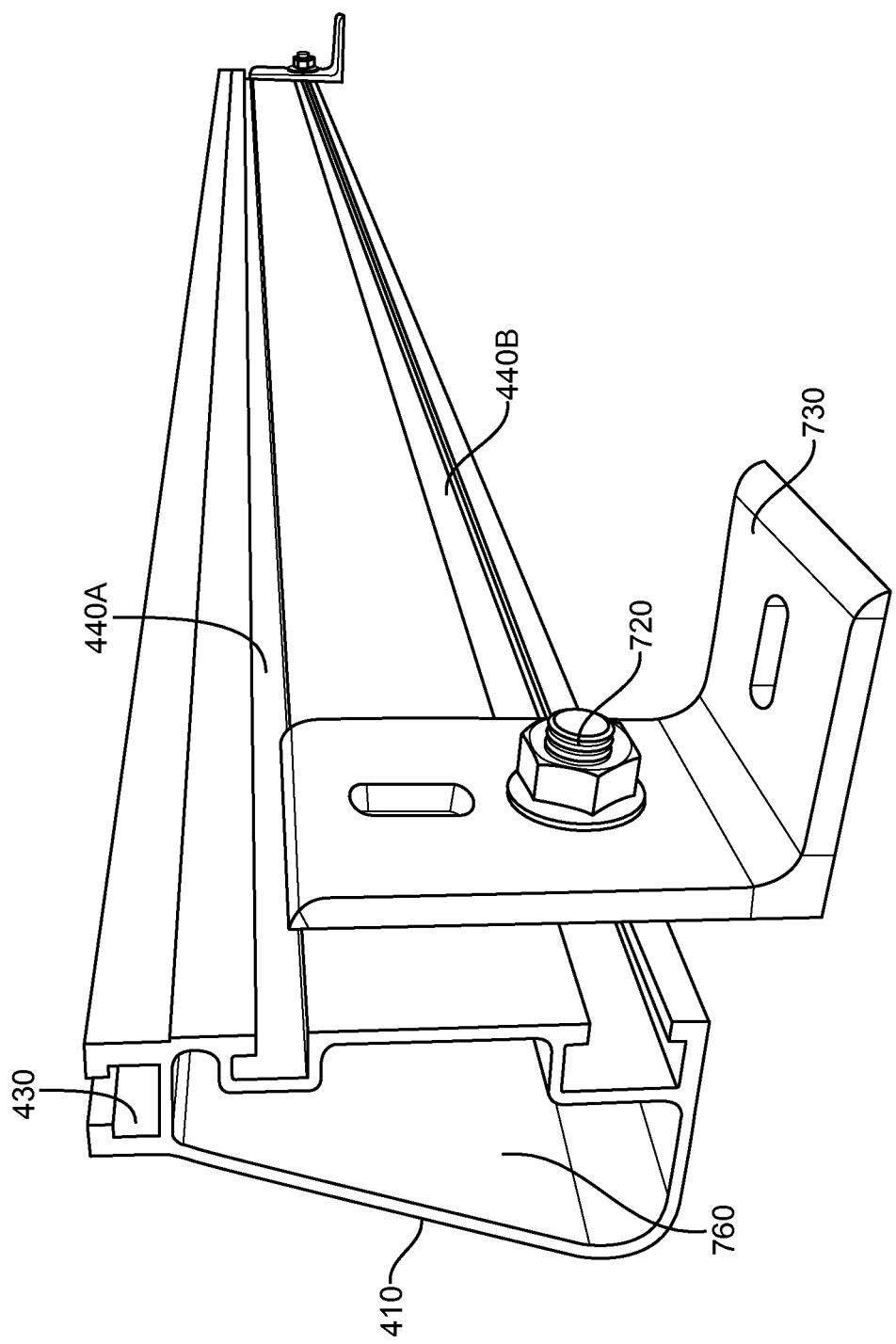
FIG. 7 shows an example of an assembled solar rack section in accordance with an embodiment of the invention.

FIG. 7 shows an example of an assembled solar rack section in accordance with an embodiment of the invention. The solar rack section may include one, two, or more side grooves 440A, 440B. Preferably, the grooves may extend along the length of the rack section. If a plurality of groove sections are provided, preferably they may be parallel to one another. The side grooves may be configured to accept a fastener 720. The fasteners may slide along the side grooves. The fasteners may connect a rack anchor 730 to the rack section. The rack anchor may contact the support surface that the solar rack is resting on. In some embodiments, the rack anchors may elevate the solar rack from the support surface.

The solar rack may also include one or more top groove 430 along the top surface of the rack section. The top groove may extend along the length of the rack section. The top groove may be configured to accept a fastener. The fastener may slide along the top groove. The fasteners may connect a solar module securing component to the rack section.

In some embodiments, a side of the rack opposing the side with the grooves may be slanted 410. In other embodiments, this side may also include one or more grooves. Thus, a solar rack may have side grooves on one, two, or more sides. In some instances, the solar rack may or may not include bottom grooves along the length of the solar rack. The solar rack may also have an inside cavity 760. The inside cavity may be configured to accept part of an internal splice bar therein. The internal cavity may have any cross-sectional shape, which may be substantially rectangular, triangular, trapezoidal, hexagonal, circular, or any other regular or irregular shape.

A solar rack assembly may include one or more of the components listed below. The following components are provided by way of example only, and additional components or substitute components may be utilized.

| Part | Qty | Comments |
| --- | --- | --- |
| Splice Kit | 1 | Used to join rack sections together 1 kit is used to splice 2 pairs of rack sections. |
| Internal Splice | 2 | |
| 10-16 × 1/2", self-drilling, self tapping screw, SS | 8 | |
| L-Foot Assembly Kit | 1 | Used to attach L-foot to XRS 1 kit per 4 L-feet. |
| L-Foot | 4 | |
| 3/8-16-1" hex cap bolt, SS | 4 | |
| 3/8-16, flange nut, SS | 4 | |
| Center Clamp Kit | 1 | Used between PV panels to secure to XRS rail 1 kit will cover 2 PV panels within a row. Part number changes depending on panel required. |
| Center Clamp | 4 | |
| 1/4-20 × 2.00" hex cap bolt, SS, or 1/4-20 × 2.50" hex cap bolt, SS, or 1/4-20 × 2.75" hex cap bolt, SS | 4 | Length of bolt depends on the thickness of the PV panel. |
| 1/4-20 flange nut, SS | 4 | |
| End Clamp Kit | 1 | Used on the first and last PV panel in a row 1 kit will cover the first and last PV panels in a row. Part number changes depending on panel used. Example part numbers shown. |
| End Clamp | 4 | |
| 1/4-20 × 1" SS hex-cap bolt, SS | 4 | |
| 1/4-20 flange nut, SS | 4 | |
| XRS Spares Kit | 1 | |

III. Methods of Installation

1. Mounting Feet and a First Solar Rack Section

Figure 8:
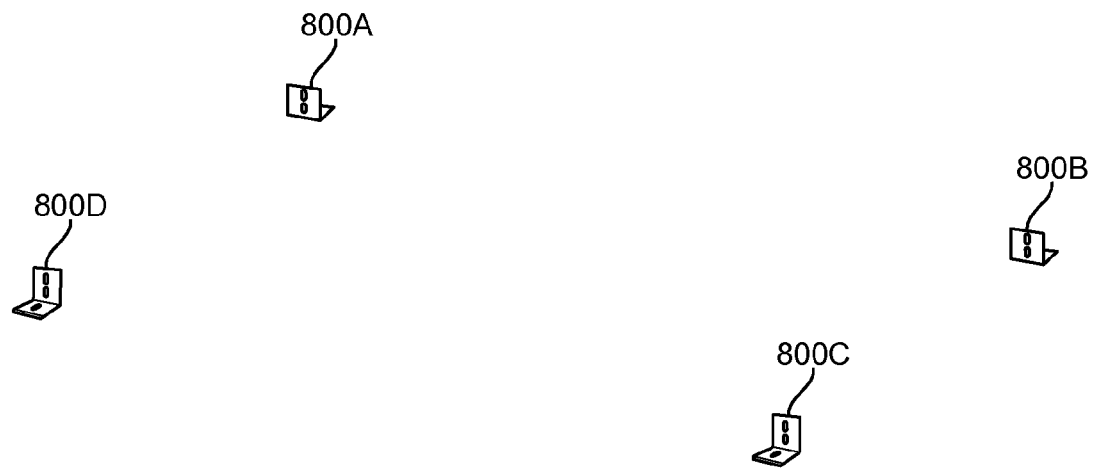
FIG. 8 illustrates a step of mounting feet to a surface.

FIG. 8 illustrates a step of mounting feet 800A, 800B, 800C, 800D to a surface. The feet may be one or more L-foot, which may function as a rack anchor. The feet may be mounted to the desired locations. In some instances, the feet may be fixed to the support surface. For example, one or more fastener may fasten the feet to a support surface. Alternatively, the feet may rest on the support surface without being fixed to it. In some instances, the feet may be substantially fixed to the support surface, such that there is some wiggle room, and that they can be tightened later as desired.

Figure 9:
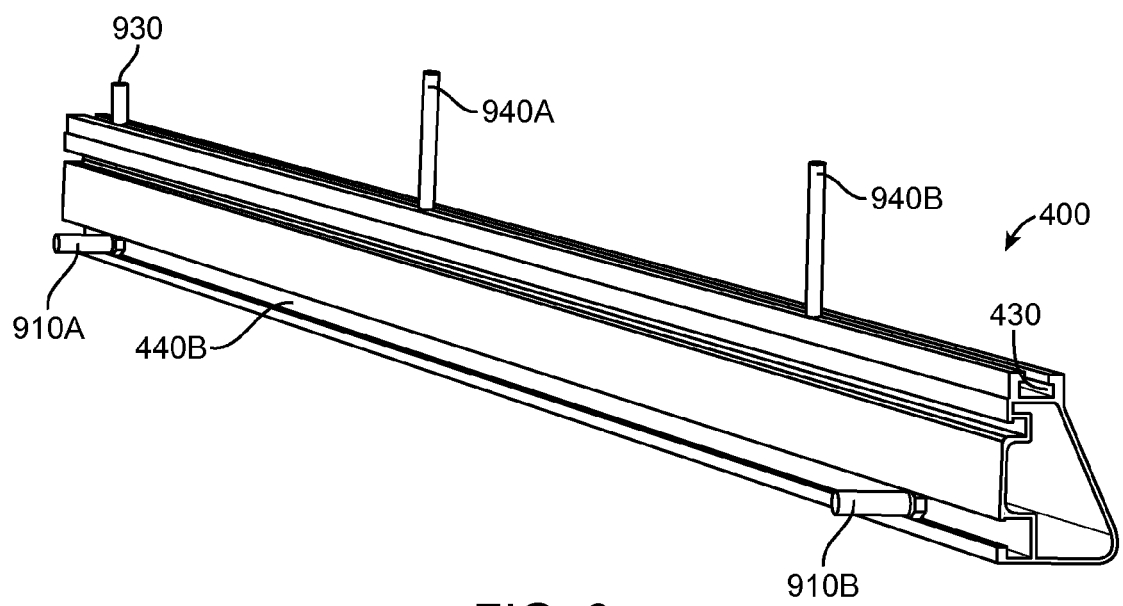
FIG. 9 illustrates a step of adding fasteners to desired positions along a solar rack section.

FIG. 9 illustrates a step of adding fasteners to desired positions along the solar rack section 400. On a first rack section, one or more fastener 910A, 910B may be slid into a side groove 440B. The side groove may be shaped as a T-slot. The fastener may have a head that fits within the T-slot, so that the fastener may slide along the length of the T-slot without falling out. In some embodiments, the fasteners may be 3/8-16" bolts. Any other size or type of fastener may be used. The fasteners may be roughly spaced to match the foot spacing.

In the same rack section, one or more fastener 930, 940A, 940B may be slid into a top groove 430. The top groove may be shaped as a T-slot. The fastener may have a head that fits within the T-slot, so that the fastener may slide along the length of the T-slot without falling out. In some embodiments, the fastener may be 1/4-20" bolts. Any other size or type of fastener may be used. In some embodiments, the fasteners may all be the same type or size, while in other embodiments, the fastener types/sizes may vary. In some instances, fasteners 930 that may connect with an end clamp may be shorter, longer, or the same length as fasteners 940A, 940B that may connect with a center clamp. The fasteners may be roughly spaced to match the solar module spacing.

Figure 10:
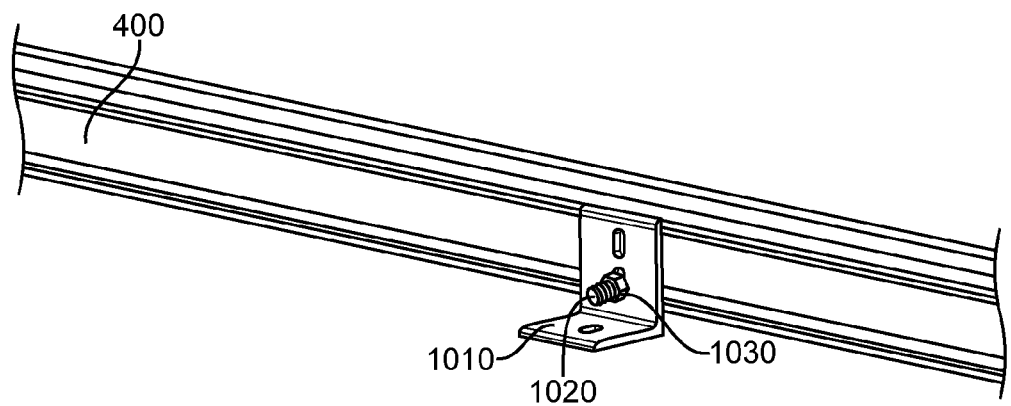
FIG. 10 shows how the solar rack section may be attached to the feet.

FIG. 10 shows how the solar rack section 400 may be attached to the feet 1010. The first solar rack section may be attached to the feet already mounted on the support surface. The rack section may be mounted to each foot with a fastener 1020. In some embodiments, the fastener may be a flange nut and a hex bolt. The nuts 1030 may be hand tightened, and then the level of the rail may be checked/adjusted as desired. After that, the nuts may be further tightened. For example, 3/8-16 hardware may be tightened to 180 in-lbs.

In some embodiments, the foot may be provided on one side of the solar rack. Multiple feet may be provided on the same side of the solar rack or on alternating sides of the solar rack. Alternatively, the foot may attach to both sides and/or extend from both sides of the solar rack.

2. Mounting the Next Rack Sections

FIG. 9 illustrates a step of adding fasteners to desired positions along a solar rack section 400. On a second or any subsequent rack section, one or more fastener 910A, 910B may be slid into a side groove 920. Like with the first rack section, the side groove may be shaped as a T-slot. The fastener may have a head that fits within the T-slot, so that the fastener may slide along the length of the T-slot without falling out. In some embodiments, the fasteners may be 3/8-16" bolts. Any other size or type of fastener may be used. The fasteners may be roughly spaced to match the foot spacing.

In the same rack section, one or more fastener 930, 940A, 940B may be slid into a top groove 430. The top groove may be shaped as a T-slot. The fastener may have a head that fits within the T-slot, so that the fastener may slide along the length of the T-slot without falling out. In some embodiments, the fastener may be 1/4-20" bolts. Any other size or type of fastener may be used. In some embodiments, the fasteners may all be the same type or size, while in other embodiments, the fastener types/sizes may vary. In some instances, fasteners that may connect with an end clamp may be shorter, longer, or the same length as fasteners that may connect with a center clamp. The fasteners may be roughly spaced to match the solar module spacing.

Any additional solar rack sections may be prepared in a similar manner as the first or second solar rack section.

Figure 12:
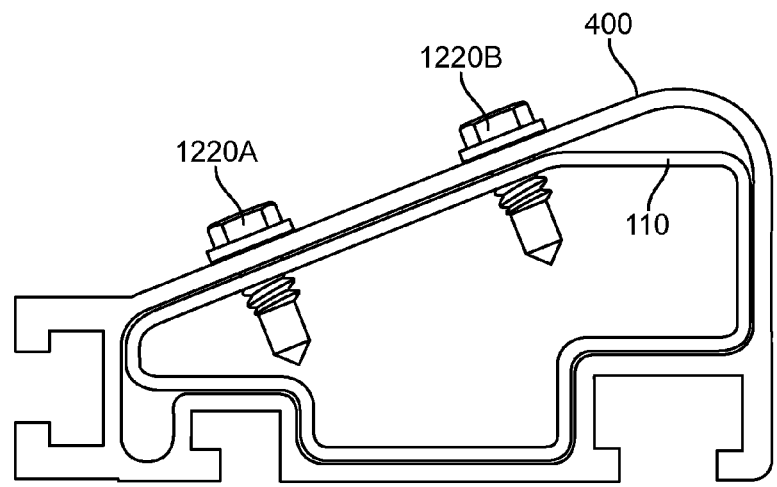
FIG. 12 shows a cross-sectional view of a solar rack section with an internal splice within, secured by a fastening mechanism.

The second rack section, or any subsequent rack section may be laid on its side with the slotted side down. FIG. 12 shows a cross-sectional view of a rack section with the slotted side down. The internal rack splice may slide into the second rack section. In preferable embodiments, it may be slid about halfway into the internal cavity of the rack section. In some embodiments, the internal rack splice may extend approximately 3 inches, 4 inches, 5 inches, 6 inches, 7 inches, 8 inches, 10 inches, or 12 inches into the cavity.

Figure 11:
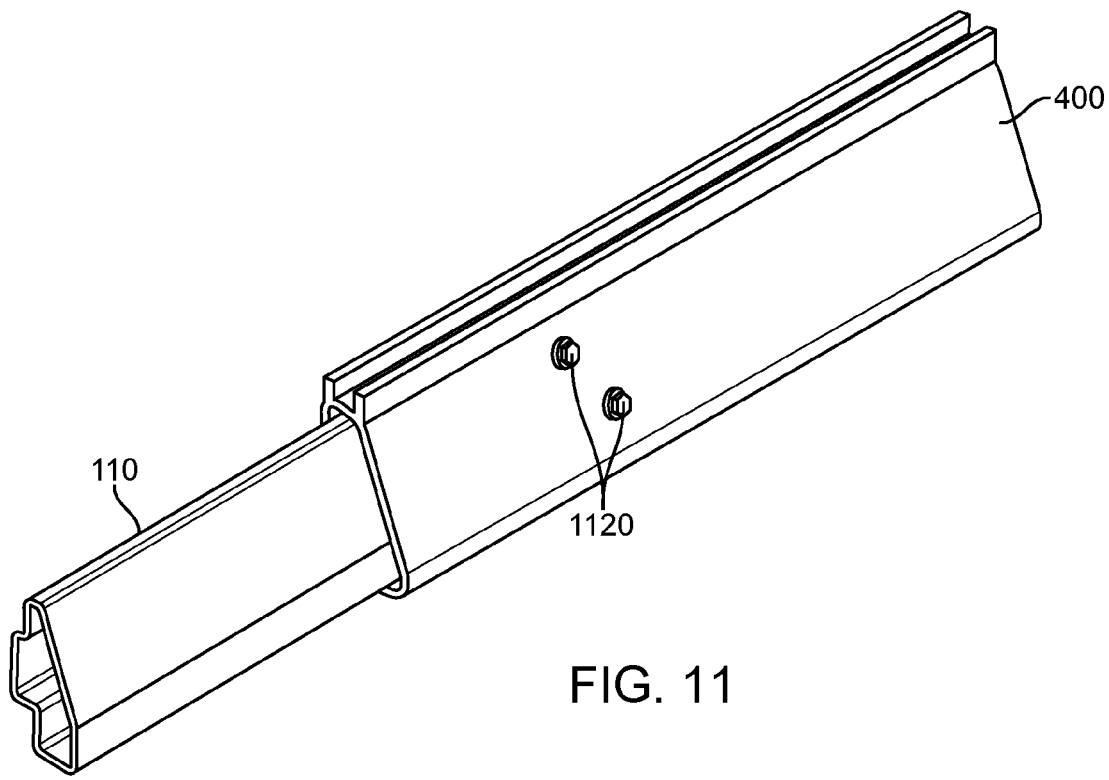
FIG. 11 provides a perspective view of a solar rack section with an internal splice placed therein.

FIG. 11 provides a perspective view of a solar rack section 400 with an internal splice 110 placed therein. The internal rack splice fits within the cavity of the rack section. In some embodiments, about half the internal rack splice may extend from the rack section. In some embodiments, the internal rack splice may extend approximately 3 inches, 4 inches, 5 inches, 6 inches, 7 inches, 8 inches, 10 inches, or 12 inches from the rack section. In some embodiments, the rack section may include an internal feature that may only allow an internal splice to go in a specified amount. Alternatively, no internal feature may be provided and the installer may judge how far to slide in the internal splice.

After the internal splice is placed at the desired amount within the rack section, a securing mechanism 1120 may secure the internal splice to the rack section. In one embodiment, two fasteners, such as self-drilling, self-tapping screws may secure the internal splice into the rail.

FIG. 12 shows a cross-sectional view of a solar rack section 400 with an internal splice 110 within, secured by a fastening mechanism. In one example, the two fasteners 1220A, 1220B may be used to secure the internal splice to the rack as shown. In other embodiments, any number of fasteners may be used, such as one, two, three, four, or more fasteners. They may be arranged in any pattern that may penetrate both the rack section and internal splice.

Alternatively, a fastener may not be needed. For example, the internal splice may be friction fit within rack sections. In another example, the rack sections may include internal features within the cavity and/or the internal splice may include external features that may mate and/or cause the internal splice to lock within the rack section. An adhesive may be applied between the internal splice and the rack section. An internal splice bar may be secured within a rack section using any other technique known or later developed in the art.

The second (or any subsequent rack section) may be loosely mounted onto its footings. The mounting of the subsequent rack sections may follow a similar procedure as mounting the first rack section on its footing. By moving this second rack section along its footings, the internal splice may be slipped into the cavity of the first rack section. In some instances, when this is done, the rack sections may be butting tightly and evenly together.

Figure 13:
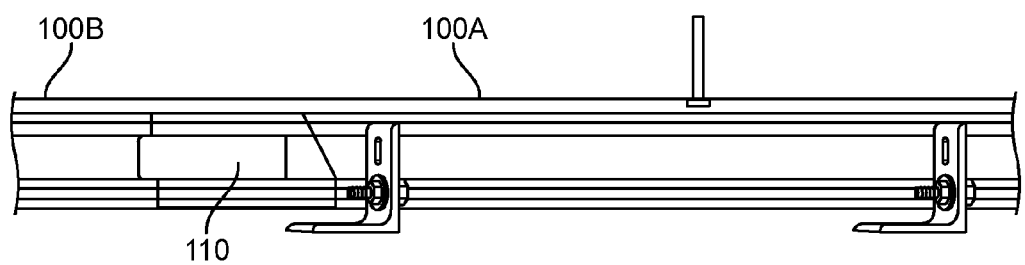
FIG. 13 shows a second solar rack section over the internal splice and connected to the first solar rack section.

FIG. 13 shows a second solar rack section 100B over the internal splice 110 and connected to the first solar rack section 100A. The internal splice is shown, connecting a first solar rack section to a second solar rack section. Although in accordance with one embodiment of the invention, the internal splice may be secured to the second rack section and then slid into the first rack section, in another embodiment, the internal rack splice may be secured within the first rack section first, and then the second rack section may slide over the internal splice. In other embodiments, the rack sections may both slide over the internal splice before the internal splice is secured to both rack sections. In other embodiments, extra securing steps may be applied to neither rack section, or to only one rack section.

Figure 14:
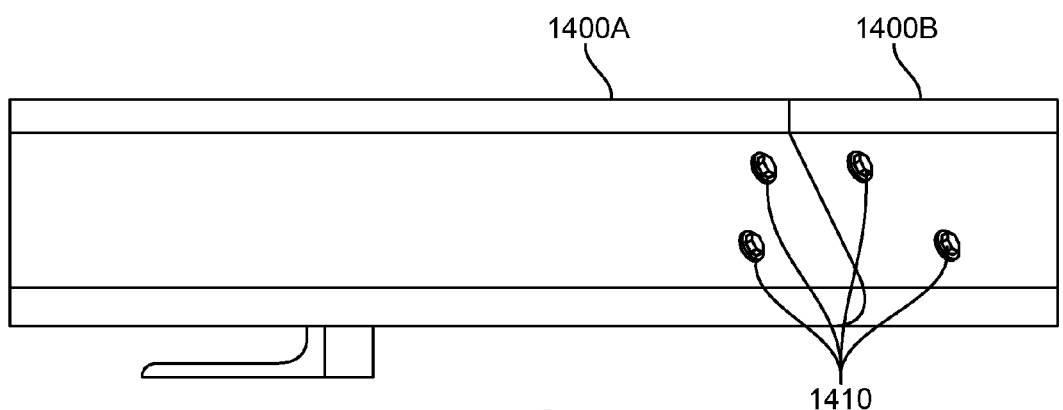
FIG. 14 shows a side view of the first and second solar rack sections and securing mechanisms for fastening the internal splice to the rack sections.

FIG. 14 shows a side view of the first 100A and second 100B solar rack sections and securing mechanisms 1120 for fastening the internal splice to the rack sections. It may be desirable to maintain rack alignment for the subsequent steps. An installer may mark off approximately 6 inches from the end of the first rack section (or any distance where the internal splice should end). Then two self tapping screws may be placed through the first rack section in utilizing the pattern shown at right within the area that was marked off. Alternatively, if the internal splice was secured to the first rack section first, this step can be done to the second rack section. The self tapping screws may be placed in any other pattern that may allow the internal splice to connect the first rack section. Any number of screws may be placed through the first rack section.

These steps may be repeated for any subsequent rack sections. This may apply to rack sections that may be added to the same rack to extend the rack further, or additional racks that may be installed at the same or neighboring support surfaces.

Figure 15:
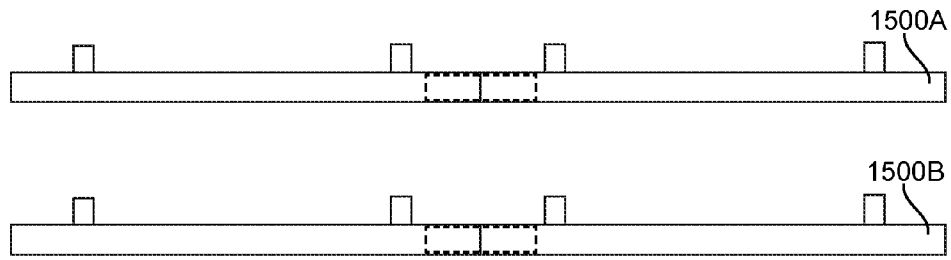
FIG. 15 shows a top view of a plurality of solar racks that may be mounted onto a surface.

FIG. 15 shows a top view of a plurality of solar racks 1500A, 1500B that may be mounted onto a surface. In some embodiments of the invention, one, two, three, four, or more solar racks may be installed onto a surface. Preferably, the racks may have substantially straight linear configurations. Alternatively, the racks may form curved or bent lines, or may include branches, or form other shapes. In some embodiments, one, two, or more racks may be used to support one or more solar module. In some embodiments, it may be preferable for the racks to be arranged in a parallel configuration. Alternatively, the racks need not be parallel and may be placed at angles to one another. The racks may be laid out in any configuration on a support surface that will provide support to the one or more solar modules.

3. Securing Solar Modules to Racks

Figure 16:
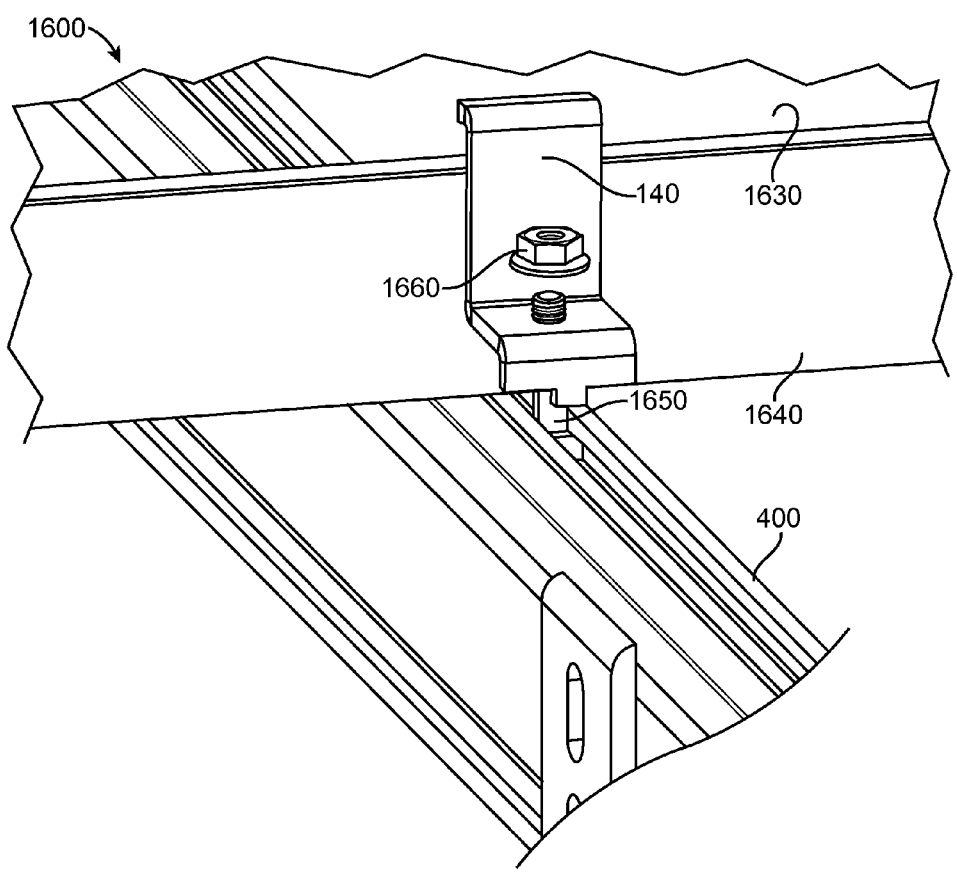
FIG. 16 shows a solar module supported on a solar rack, with a solar module securing component being positioned.

FIG. 16 shows a solar module 1600 supported on the solar rack 400, with a solar module securing component 140 being positioned. A solar module may include a solar photovoltaic (PV) panel 1630 and/or a module frame 1640 that may surround, partially surround, or support the panel.

A first solar PV module 1600 may be laid in position on one or more solar racks. A first bolt 1650, or other fastener may already be provided on the solar rack 400 and/or may be subsequently placed on the solar rack at a desired position. The first bolt may be placed adjacent to the solar module. In one embodiment, the securing component may be an end clamp. The end clamp may slide over the bolt, so that it is firmly hooked over the side of the solar module. In some embodiments, it may hook over the module frame. A flange nut 1660 may be provided on the bolt over the end clamp.

Figure 17:
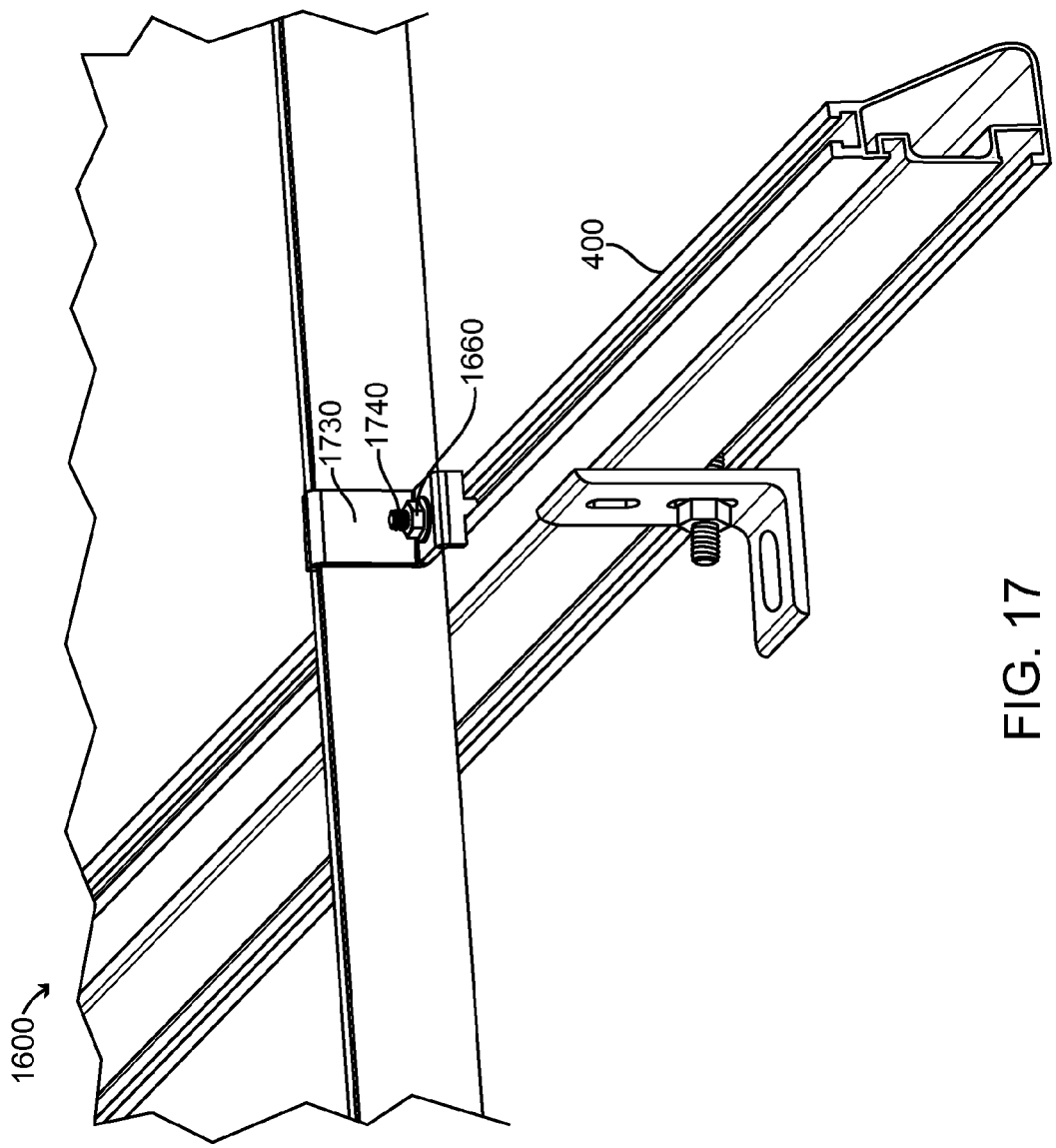
FIG. 17 shows a solar module that has been secured on a solar rack.

FIG. 17 shows a solar module 1600 that has been secured on the solar rack 400. The clamp assembly may be completed with a flange nut 1660, or other securing mechanism that may secure a clamp 1730 to a bolt/fastener 1740. The flange nut, or any other securing mechanism may be tightened to the desired degree. In some instances, it may be desirable to tighten the clamp to 60-65 in-lbs. Alternatively, the torque values may exceed 50 in-lbs, 60 in-lbs, 65 in-lbs, 70 in-lbs, or have any other value.

If there are any additional racks that are supporting the solar module, a securing mechanism, such as an end clamp may also be applied from the additional racks to the solar module. In some instances, this may result in multiple end clamps hooking over a frame of a solar module. In some instances, the end clamps may be provided on one side of the PV module.

Working from the opposite side of the PV module, a bolt may be provided on the rack that may be adjacent to the PV module. The bold may slide along the rack to be brought into place next to the PV module. Any other fastener may be used.

A securing mechanism, such as a center clamp, may be placed over the bold. The center clamp may have a portion that may hook over the PV module. In some embodiments, the center clamp may also have one or more tabs that may go to the side of the solar module. FIG. 6 shows an example of a center clamp.

Figure 18:
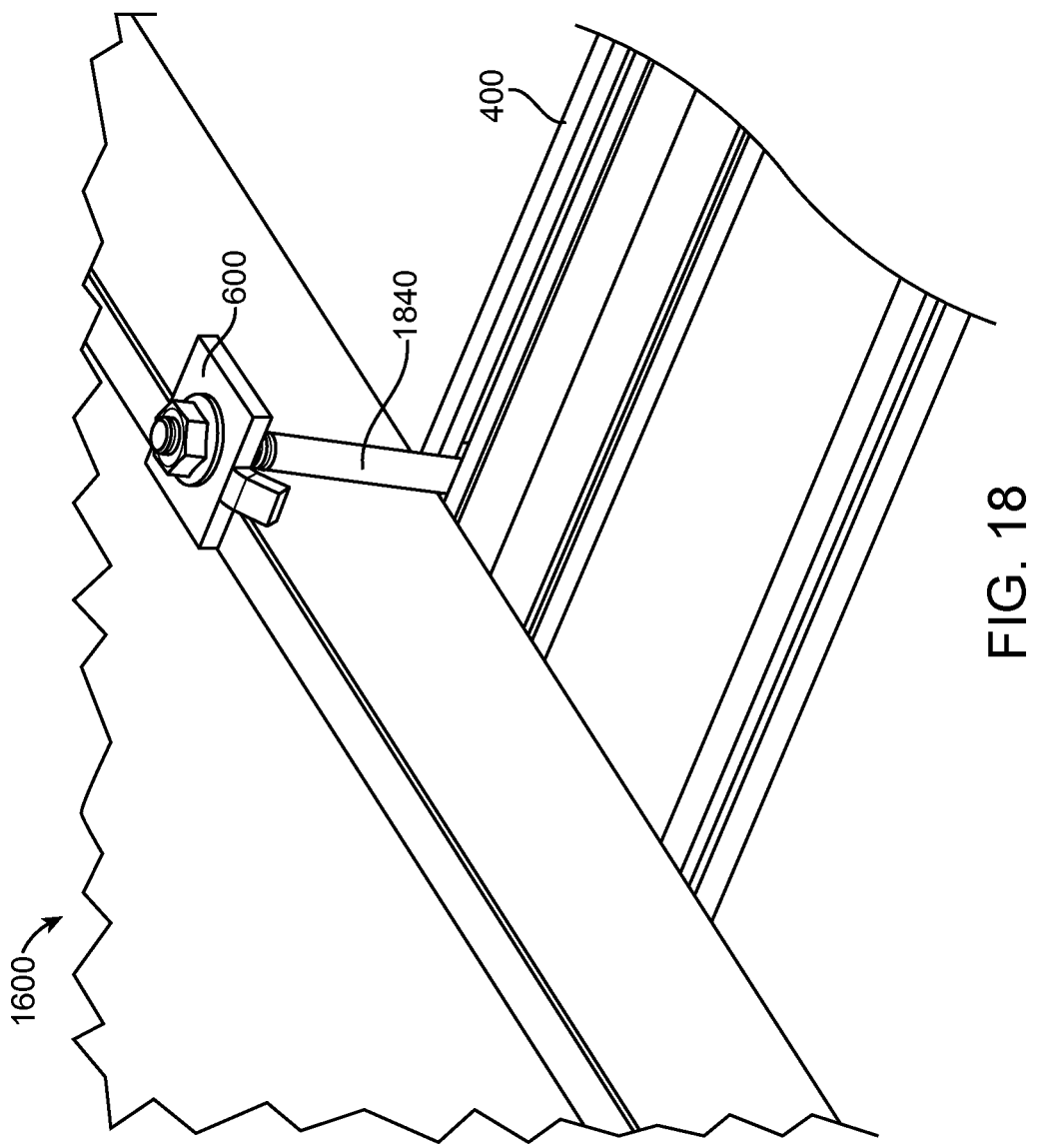
FIG. 18 shows a solar module supported on a solar rack, with another example of a solar module securing component.

FIG. 18 shows a solar module 1600 supported on a solar rack 400, with another example of a solar module securing component. The solar module securing component may be a center clamp 600. A flange nut 1830 or any other securing mechanism may be placed over the center clamp and a bolt 1840 to secure the center clamp in place. As previously described, the center clamp may hook over part of the PV module. For example, one side of the center clamp may hook over the PV module frame on the side opposite the PV module.

Figure 19:
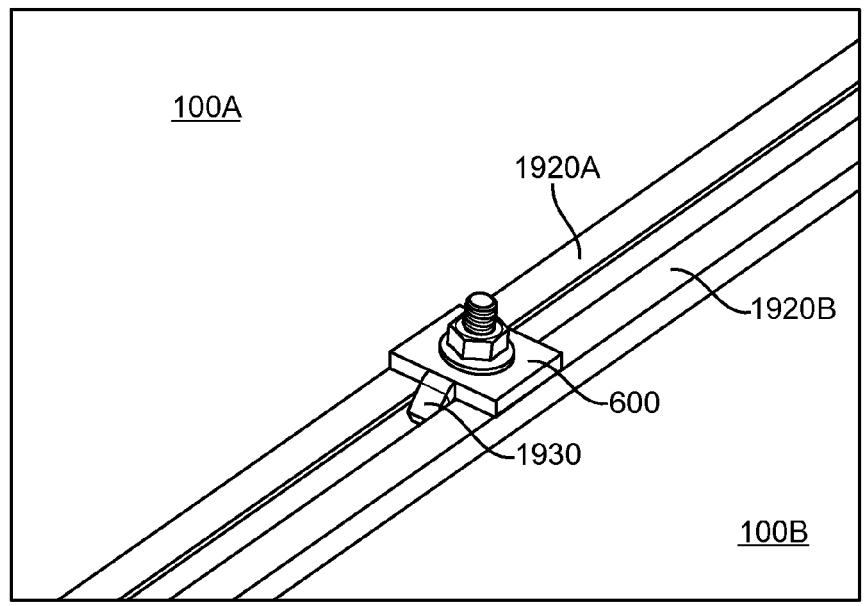
FIG. 19 shows a first solar module and a second solar module that has been secured on a solar rack with a solar module securing component.

Place the second PV Module into position on the rails, sliding it against the first so the center clamps are in contact with the edges of both panels. FIG. 19 shows a first PV module 100A and a second PV module 100B that has been secured on a solar rack with a solar module securing component, which in this case may be a center clamp 600. The center clamp may be positioned so that the center clamp covers the frames 1920A, 1920B of both PV modules. In some embodiments, the center clamp may hook over both frames. The center clamp may be configured to retain the solar module along the solar rack. One or more tabs 1930 may be provided that may fit between the PV modules and/or space the PV modules.

If there are any additional racks that are supporting the PV module, a securing mechanism, such as a center clamp may also be applied from the additional racks to the PV module. In some instances, this may result in multiple center clamps hooking over a frame of a solar module. In some instances, the end clamps may be provided on one side of the PV module. In some instances, this may be the side opposite the side of the PV module with end clamps. In other embodiments, the opposite side of the PV module may also have center clamps.

The clamp assembly may be completed with a flange nut, or other securing mechanism that may secure a center clamp to a bolt/fastener. The flange nut, or any other securing mechanism may be tightened to the desired degree. In some instances, it may be desirable to tighten the clamp to about 84 in-lbs.

For any subsequent PV modules that are added, the previous steps may be repeated. The last solar module may be secured with a set of end clamps. When a PV module is at the end of a solar array, it may be preferable to secure the outside edge with end clamps. When PV modules are placed directly adjacent to one another, it may be preferable to use center clamps to secure them on the side where they are adjacent. However, other types of clamps or securing mechanisms may be used. FIG. 1A shows an example of a solar rack which could be used to support three adjacent PV modules, with two end clamps at the ends of the modules, and two center clamps between the modules. Alternatively, when they are spaced apart along the solar rack, end clamps may be used to secure them. FIG. 1B shows an example of a solar rack which could be used to support three PV modules that are a little spaced apart, with six end clamps for the sides of the modules. Even when the PV modules are adjacent to one another, end clamps may be used between them.

Using an internal splice to connect the solar racks may allow the solar racks to have a continuous exterior surface. This may advantageously provide flexibility in the placement of solar modules on the racks. A securing mechanism, such as an end clamp or center clamp may be provided anywhere along the entire length of the solar rack, even where the solar rack sections meet. Similarly, a solar module may be placed anywhere along the length of the solar rack, even where the solar rack sections meet. This may also provide flexibility in the size and shapes of the solar modules that may be supported by the solar racks.

Figure 20:
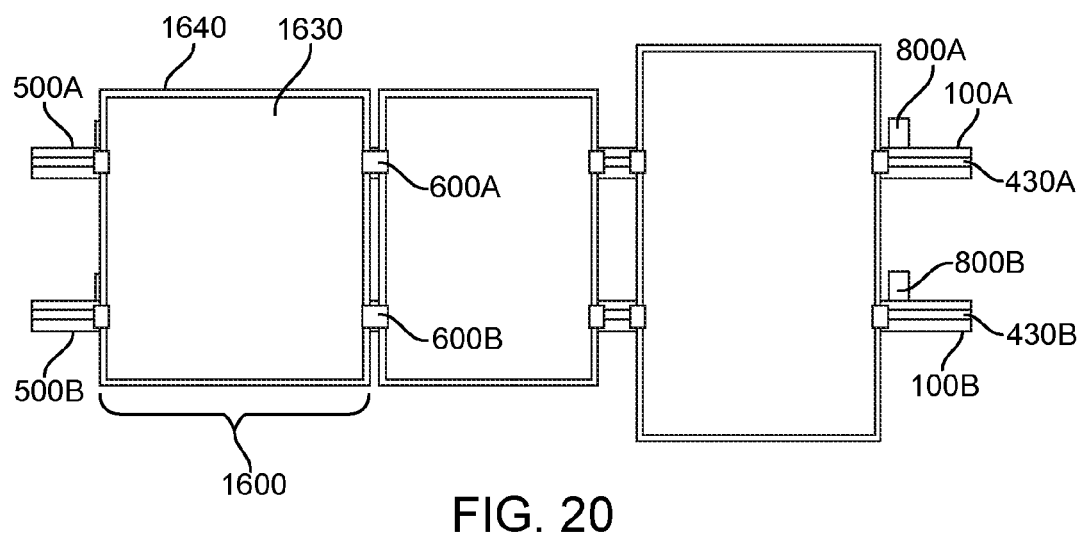
FIG. 20 shows a top view of a solar assembly with a plurality of solar modules supported by solar racks.

FIG. 20 shows a top view of a solar assembly with a plurality of solar modules supported by solar racks. For example, a first solar rack 100A and a second solar rack 100B may be positioned substantially parallel to one another. In some embodiments, the first solar rack may have a first top groove 430A and a second solar rack may have a second top groove 430B. In other embodiments, multiple top grooves may be provided and/or side grooves may be provided. The solar racks may be supported by one or more feet 800A, 800B. The feet may connect the solar racks to an underlying support surface.

One or more solar module 1600 may be supported by the solar racks 100A, 100B. A solar module may include a solar PV panel 1630 and a module frame 1640. A solar panel may have any shape or dimensions or configuration known in the art. In some embodiments, the solar panel may form a rectangle, triangle, circle, ellipse, square, pentagon, hexagon, octagon, or any other shape. The module frame may or may not conform to the shape of the solar panel. Additional features or components may also be provided for a solar module. This may include configurations to accommodate wiring or electrical components. As shown in FIG. 20, the solar modules may have differing dimensions from one another. Alternatively, they may all have the same dimensions.

One or more securing mechanism may be used to secure the solar modules 1600 on the racks 100A, 100B. In one example, the securing mechanism may be an end clamp 500A, 500B. In another example, the securing mechanism may be a center clamp 600A 600B. In some embodiments, the solar modules may be adjacent to one another, in which case, it may be desirable to use the center clamps to secure them to the solar racks. The end clamps may be provided on the sides of the solar modules that are not directly adjacent to another solar module. In some instances, the solar modules may be placed so that one or more of them are spaced apart, in which case it may be desirable to use end clamps to secure them.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A solar rack comprising:
    a first solar rack section having a first uppermost external surface with a first top groove;
    a second solar rack section having a second uppermost external surface with a second top groove, wherein the first solar rack section and the second solar rack section include: one or more rack anchors configured to adjustably elevate the first solar rack section or second solar rack section at a selected height above a support surface;
    each of the first and second solar rack sections having a first side with a side groove and a second side, opposing the first side, that is slanted with respect to the first side;
    an internal rack splice to internally support the first solar rack section and the second solar rack section, thereby connecting the first solar rack section to the second solar rack section such that the first top groove and the second top groove are longitudinally aligned; and
    one or more solar module securing components, wherein at least a portion of said solar module securing component fits into at least one of the first top groove and second top groove, and wherein said solar module securing component is configured to removably secure a separate solar module onto at least one of the first uppermost external surface and the second uppermost external surface of the solar rack.

2. The rack of claim 1 wherein the first solar rack section directly contacts the second solar rack section.

3. The rack of claim 1 further comprising one or more fasteners securing the first solar rack section to the internal rack splice and one or more fastener securing the second solar rack section to the internal rack splice.

4. The rack of claim 1 wherein the solar module securing component is an end clamp or a center clamp.

5. A photovoltaic system comprising:
    a first solar rack section having a first uppermost external surface with a first top groove;
    a second solar rack section having a second uppermost external surface with a second top groove, wherein the first solar rack section and the second solar rack section include: one or more rack anchors configured to adjustably elevate the first solar rack section or second solar rack section at a selected height above a support surface, and;
    each of the first and second solar rack sections having a first side with a side groove and a second side, opposing the first side, that is slanted with respect to the first side;
    an internal rack splice formed with a substantially consistent and uniform cross-section along its entire length for placement within the first internal region and the second internal region, and configured to internally connect the first solar rack section to the second solar rack section such that the first top groove and the second top groove are longitudinally aligned; and
    one or more solar modules connected to the first solar rack section or the second solar rack section,
    wherein the one or more solar modules is removably connected via a solar module securing component that at least partially fits within at least one of the top grooves of the first solar rack section or the second solar rack section, and
    wherein the one or more solar modules is mounted directly onto at least one of the first uppermost external surface or second uppermost external surface of the respective first solar rack section and second solar rack section.

6. The system of claim 5 wherein the solar module is connected via an end clamp or a center clamp.

7. The system of claim 5 wherein the internal rack splice fits snugly within at least part of the first solar rack section or the second solar rack section.

8. The system of claim 5 wherein the solar module includes a solar photovoltaic panel.

9. The system of claim 5 wherein the one or more solar modules contacts a first rack comprising the first solar rack section and the second solar rack section, and a second rack.

\* \* \* \* \*